United States Patent
Watanabe et al.

(10) Patent No.: US 6,755,371 B2
(45) Date of Patent: Jun. 29, 2004

(54) FILM WINDING METHOD, FILM WINDING APPARATUS, AND FILM MANUFACTURING APPARATUS

(75) Inventors: Kenji Watanabe, Minamiashigara (JP); Akio Hiroi, Minamiashigara (JP); Fujio Kuwabara, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 177 days.

(21) Appl. No.: 09/988,364

(22) Filed: Nov. 19, 2001

(65) Prior Publication Data

US 2002/0084375 A1 Jul. 4, 2002

(30) Foreign Application Priority Data

Nov. 20, 2000 (JP) ........................................ 2000-353328

(51) Int. Cl.[7] .............................................. B65H 18/08
(52) U.S. Cl. ................................................... 242/530.3
(58) Field of Search ............................. 242/571, 571.2, 242/571.3, 571.6, 571.7, 571.8, 530.1, 530.3, 576, 576.1; 192/76; 279/2.2, 2.07, 2.08, 2.09, 2.23

(56) References Cited

U.S. PATENT DOCUMENTS

| | | | | |
|---|---|---|---|---|
| 2,561,745 A | * | 7/1951 | Lerch | 242/571.7 |
| 3,817,468 A | * | 6/1974 | Smolderen et al. | 242/571.7 |
| 4,143,830 A | * | 3/1979 | Dee | 242/571.7 |
| 4,193,633 A | * | 3/1980 | Potter | 279/2.2 |
| 4,496,114 A | * | 1/1985 | Kataoka | 242/571.7 |
| 4,693,431 A | * | 9/1987 | Kataoka | 242/571.7 |
| 4,767,077 A | * | 8/1988 | Kataoka | 242/571.7 |
| 5,375,791 A | * | 12/1994 | Kline et al. | 279/2.07 |
| 6,267,318 B1 | * | 7/2001 | Gensheimer | 242/530.3 |

* cited by examiner

Primary Examiner—William A. Rivera
(74) Attorney, Agent, or Firm—Sughrue Mion, PLLC

(57) ABSTRACT

A winding mechanism for winding a narrower web has a drive shaft with a torque transmitting member fixedly mounted thereon, and a holder rotatably mounted on the drive shaft with a spring disposed around an outer circumferential surface of the holder with cushioning members interposed therebetween. Stoppers are disposed respectively in three chambers defined in the holder. A groove is defined in an inner circumferential surface of a winding core around which the narrower web is wound, and the cushioning members are fitted in the groove. A pressing force of the spring is applied through the stoppers to the winding core which is mounted on the holder.

10 Claims, 14 Drawing Sheets

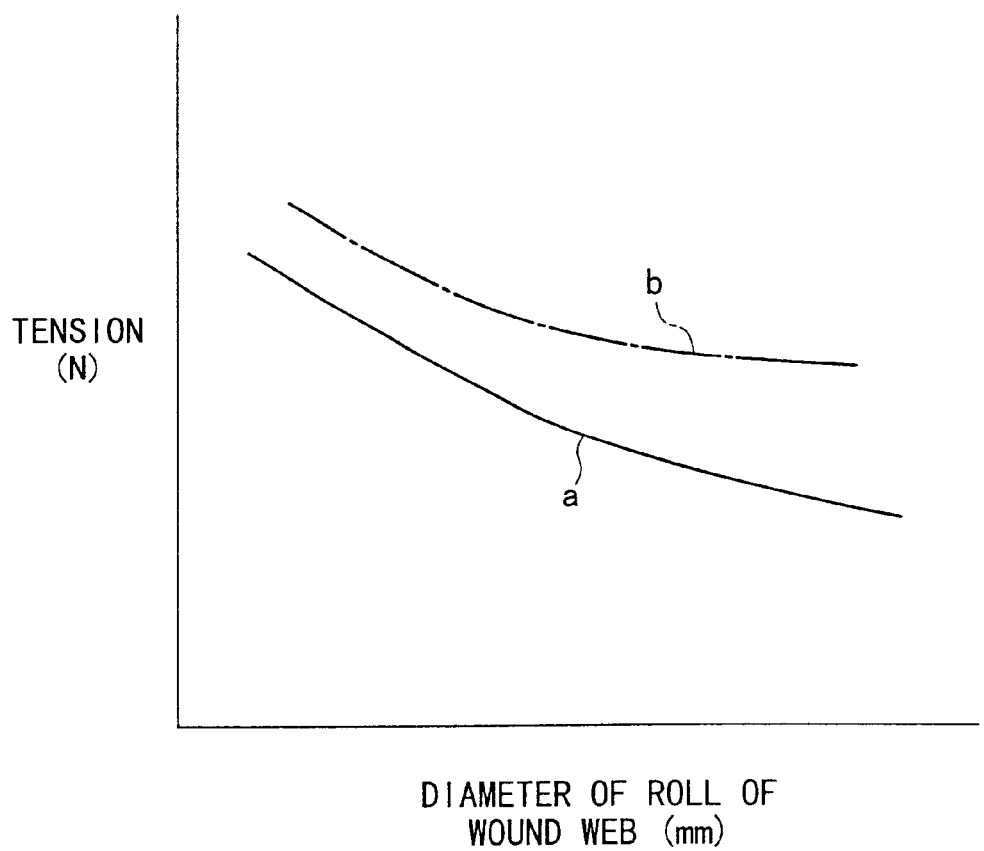

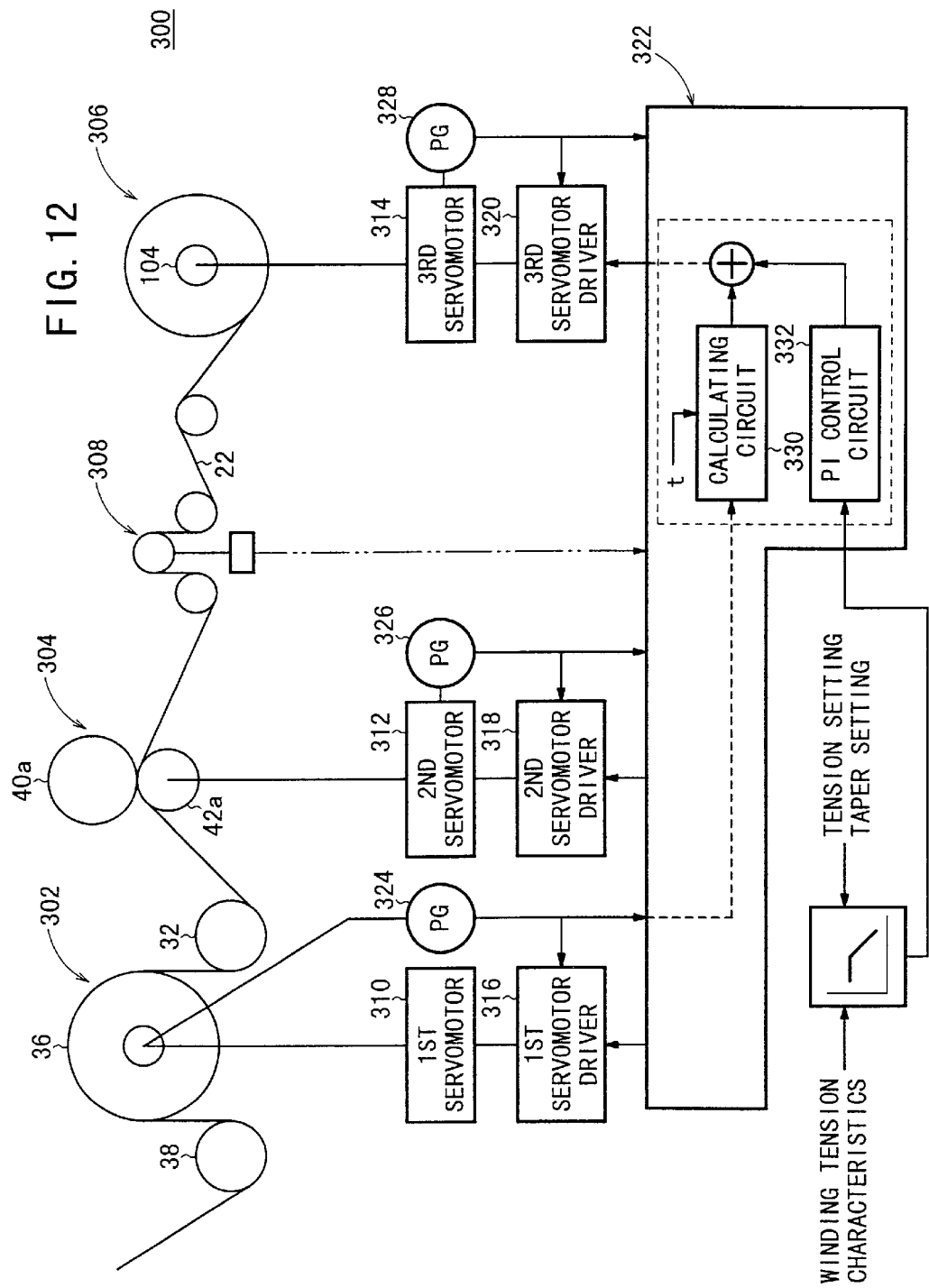

FILM WINDING METHOD, FILM WINDING APPARATUS, AND FILM MANUFACTURING APPARATUS

BACKGROUND OF THE INVENTION

1. Field of the Invention

The present invention relates to a film winding method, a film winding apparatus, and a film manufacturing apparatus for manufacturing a film from a raw web of photographic photosensitive material.

2. Description of the Related Art

Recent film winding apparatus for use in film manufacturing apparatus serve to wind a strip-like member having a small thickness ranging from 10 to 20 μm and a small width, such as a ½-inch or an 8-mm magnetic tape. Those film winding apparatus which cause tension variations of ±5% or less in the strip-like member when it is wound are now in practical use.

There have not been available any film winding apparatus which cause low tension variations in the strip-like member when it is wound if the strip-like member has a large thickness ranging from 100 to 150 μm and a large width, such as a web of photographic photosensitive material.

For example, as shown in FIG. 14 of the accompanying drawings, a conventional web winding apparatus 1 comprises a drive shaft 3 having an air tube 2 disposed therein and a pair of axially spaced bearings 4, 5 fixedly mounted on the drive shaft 3. A winding core 7 for winding a web 6 therearound is rotatably mounted on the outer circumferential surfaces of the bearings 4, 5. Displacement transmitting members 9 with felt members 8 disposed on their radially outer ends are mounted on a portion of the air tube 2 which is radially aligned with the winding core 7 between the bearings 4, 5.

When compressed air is introduced into the air tube 2, the air tube 2 is radially expanded to displace the displacement transmitting members 9 radially outwardly to press and rub the felt members 8 against the inner wall surface of the winding core 7.

The conventional web winding apparatus 1 is thus arranged to utilize the torque produced when the felt members 8 are rubbed against the winding core 7 as generating a tension imparted to the web 6 when the web 6 is wound around the winding core 7.

However, the conventional web winding apparatus 1 is disadvantageous in that the generated tension is not stable, with tension variations reduced only to about ±15% under best conditions, and it fails to generate large tension because of its principles. The maximum tension that can be generated is about 9.8 N due to the heat generated by the apparatus, and some components tend to be deformed by the generated heat if more tension is to be generated. In addition, since the air tube 2 is mounted in the drive shaft 3 and the felt members 8 are mounted on the radially outer ends of the displacement transmitting members 9, the conventional web winding apparatus 1 is structurally complex and needs skilled workmanship for its maintenance.

In the conventional web winding apparatus 1, the bearings 4, 5 and the winding core 7 are not fixed to each other by a fixing means. Therefore, when the web 6 is wound, the winding core 7 tends to be detached from the bearings 4, 5, failing to accurately wind the web 6 around the winding core 7.

When the winding core 7 with the web 6 wound therearound is removed from the bearings 4, 5, the pressure caused by the wound web 6 is applied through the winding core 7 to the bearings 4, 5. Therefore, intensive laborious attempts are required to release the web 6 from the bearings 4, 5.

SUMMARY OF THE INVENTION

It is a general object of the present invention to provide a film winding method and a film winding apparatus which are capable of obtaining a desired tension easily and stably.

A major object of the present invention is to provide a film manufacturing apparatus which allows a winding core with a web wound therearound to be released easily.

According to the present invention, a film winding method detects in advance torque characteristics of a holder on which a winding core is fixedly mounted and which is rotated by a torque generating means upon rotation of a drive shaft. A radius of a roll of the web wound around the winding core which corresponds to a cut length of the web is detected, and a winding tension of the holder which corresponds to the radius of the roll of the wound web is calculated. A rotational speed of the drive shaft is set based on the torque characteristics in order to obtain the calculated winding tension.

When the web is wound around the winding core, a stable winding tension can reliably be obtained at all times. It is thus possible to wind various webs having different thicknesses, for example, highly accurately.

The film winding method also has the steps of setting a slip rotational speed depending on the torque characteristics of the holder, calculating the radius of the roll of the wound web using the outside diameter of the winding core, the thickness of the web, and the cut length of the web, setting an initial tension and a rate of change of the tension which correspond to the radius of the roll of the wound web, and calculating the winding tension corresponding to the initial tension and the rate of change of the tension, and adding the slip rotational speed to the winding rotational speed of the holder to set a rotational speed of the drive shaft in order to obtain the calculated winding tension. It is thus possible to wind the web highly accurately under a desired winding tension under simple control, and to effectively handle changes in the thickness of the web.

According to the present invention, an apparatus for winding a web has a plurality of winding mechanisms each having a holder rotatably mounted on a drive shaft by a torque generating means, joined members having joining grooves, and lock means for preventing a winding core from being detached from the holder when the web is wound around the winding core, the winding mechanisms being joined together as a joined array by joining members fitted in the joining grooves.

The torque generating means comprises magnets and copper sheets selectively mounted on the drive shaft and the holder. Therefore, it is possible to obtain a relatively large tension with a simple arrangement, and to wind a web of a large thickness around the winding core highly accurately.

The lock means preferably comprises stoppers for pressing the winding core outwardly of the holder and moving means for moving the stoppers in a direction to increase a pressing force applied to the winding core before the web is wound around the winding core, and moving the stoppers in a direction to reduce the pressing force applied to the winding core when the winding core with the web wound therearound is removed from the holder. Preferably, the moving means has chambers defined in the holder and having tapered bottom surfaces, the stoppers being rotatably disposed in the chambers and having portions projecting outwardly from the outer circumferential surface of the holder.

With the above arrangement, the winding core is prevented from being detached from the holder under the pressing force while the web is being wound around the winding core. After the winding of the web is finished, the winding core is rotated in a direction opposite to the direction in which the web is wound, thereby to eliminate the pressing force applied via the stoppers to the winding core outwardly of the holder, thus allowing the winding core to be released easily from the winding mechanism.

The pressing force may be applied through the stoppers to the winding core by a resilient member wound around the holder. Cushioning members pressed inwardly of the holder may be held against the outer circumferential surface of the holder by the resilient member.

A torque generated by the drive shaft may be transmitted through the stoppers to the winding core. The winding core may have a groove defined therein, the cushioning members being fitted in the groove. The holder and the winding core are thus firmly fixed to each other.

The joining members may be made of resin. If the joining members of resin are used, then the weight of the joined winding mechanisms is reduced, and unwanted noise is prevented from being produced when the winding mechanisms are in operation. Since no joining members are required to be connected to the drive shaft to join the winding mechanisms, no extra load needs to be imposed on the drive shaft, and the drive shaft is prevented from being unduly deformed.

The joined array of the winding mechanisms has bolts attached to opposite ends thereof for preventing the winding mechanisms from being detached. Even while the drive shaft is in rotation, the web can smoothly be wound without the danger of the winding mechanisms becoming detached.

An apparatus for manufacturing a film according to the present invention has a roller for taking up variations of tension of a web and detecting a value of the tension, a roller for stretching the web to remove wrinkles therefrom, a roller for positioning the center of the web, a cutting unit having blades for cutting the web into a plurality of webs, and a plurality of winding mechanisms for winding the cut webs around respective winding cores. It is possible with this arrangement to apply a stable winding tension at all times, allowing the web cut to a desired length to be wound highly accurately around the winding core, and improving a slit width accuracy and a cut surface of the web. The apparatus makes it possible to manufacture a film efficiently and highly accurately.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 11 is a diagram showing how tension varies depending on the diameter of a wound film;

FIG. 12 is a schematic view, partly in block form, of a film manufacturing apparatus incorporating a winding apparatus according to a second embodiment of the present invention;

DESCRIPTION OF THE PREFERRED EMBODIMENTS

Figure 1:
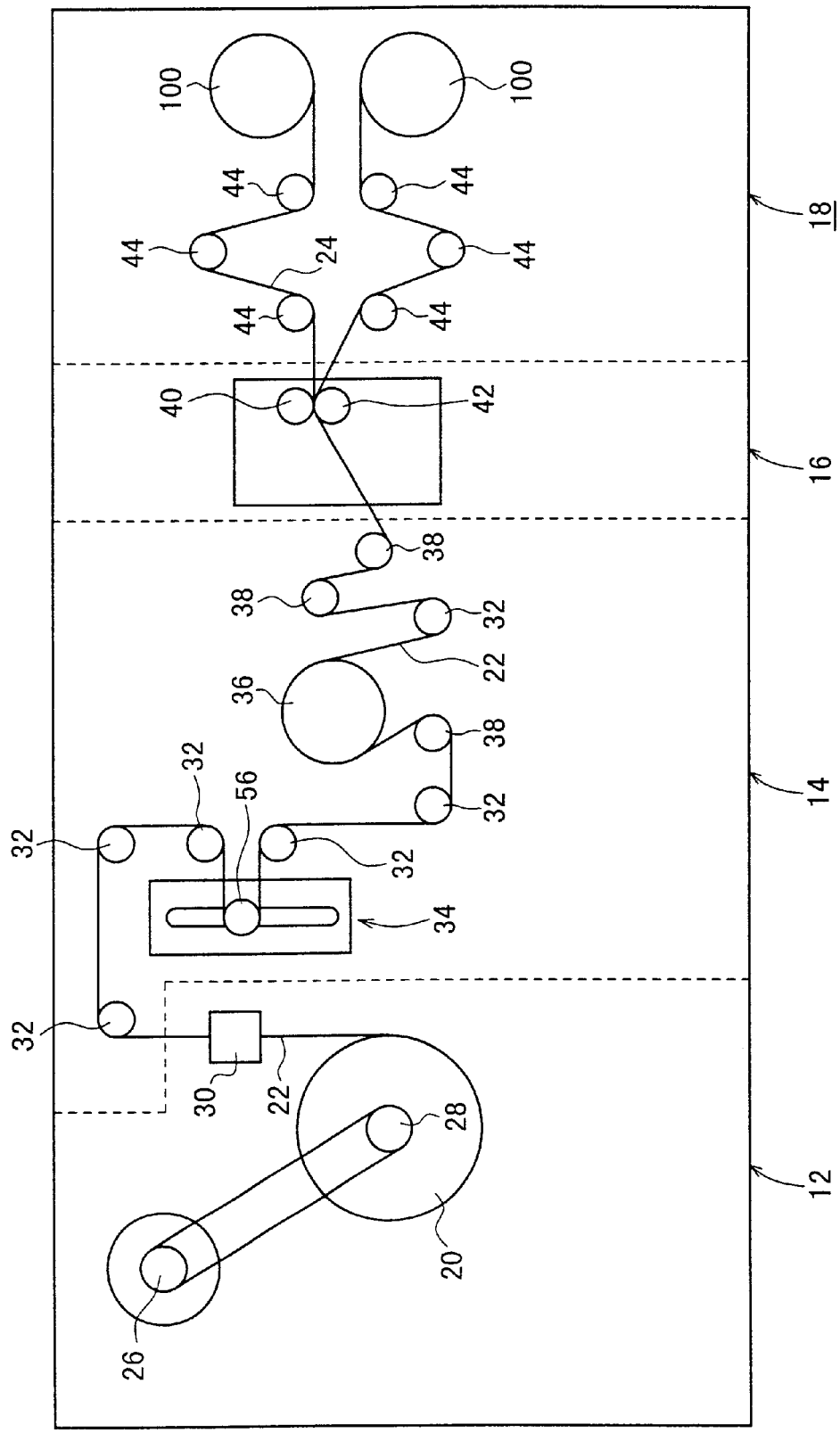
FIG. 1 is a schematic elevational view of a film manufacturing apparatus according to a first embodiment of the present invention.

FIG. 1 schematically shows a film manufacturing apparatus 10 according to a first embodiment of the present invention.

As shown in FIG. 1, the film manufacturing apparatus 10 comprises a supply apparatus 12 for supplying a web 22 from a raw web 20 in the form of a roll, a feed apparatus 14 for feeding the web 22 supplied from the supply device 12 to a cutting apparatus (cutting unit) 16, and a winding apparatus 18 according to a first embodiment of the present invention for winding webs 24 of a small width (e.g., the width of a movie film) which are continuously cut from the web 22 by the cutting apparatus 16.

The supply apparatus 12 has a support shaft 28 rotatable by a motor 26 for supplying the web 22 from the raw web 20 and an edge position detector 30 for detecting a deviation of an edge of the supplied web 22 from ends of feed rollers 32 in the feed apparatus 14.

The feed apparatus 14 has a plurality of feed rollers 32 disposed on and along a feed path of the web 22 before it is cut. The feed apparatus 14 also has a dancer roller unit 34 for taking up variations of the tension of the web 22 being fed, the dancer roller unit 34 being connected to a detector (not shown) for detecting the values of the variations of the tension of the web 22, a suction roller 36 serving as a main feed roller for controlling the speed at which the web 22 is fed, and three crown rollers 38 for stretching the web 22 to remove wrinkles therefrom.

The suction roller 36 has a number of air inlet holes (not shown) defined in its outer circumferential surface for drawing in air to attract the web 22 against slippage on the suction roller 36.

Figure 2A:
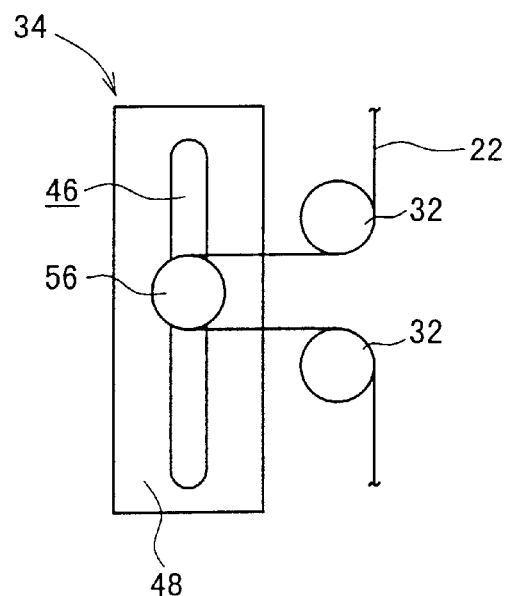
FIG. 2A is a front elevational view of a dancer roller unit of the film manufacturing apparatus.
Figure 2B:
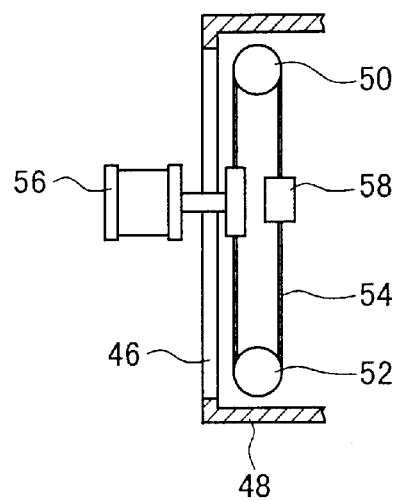
FIG. 2B is a vertical cross-sectional view of the dancer roller unit.

As shown in FIGS. 2A and 2B, the dancer roller unit 34 comprises a guide plate 48 made of plastics or metal and having a vertical slit 46 defined therein, upper and lower rollers 50, 52 disposed in the guide plate 48, a belt 54 trained around the upper and lower rollers 50, 52, a dancer roller 56 connected to a run of the belt 54 near the slit 46 and vertically movable along the slit 46 outside of the guide plate 48, and a counterweight 58 mounted on the belt 54. The counterweight 58 is positioned on the other run of the belt 54 opposite to the dancer roller 56 for preventing the dancer roller 56 from quickly falling by gravity and also preventing the dancer roller 56 from quickly rising as the web 22 is fed.

The cutting apparatus 16 has an upper blade 40 and a lower blade 42 for cutting the web 22 fed from the feed apparatus 14 into a number of narrower webs 24, the upper blade 40 and the lower blade 42 having respective cutting edges confronting each other. The narrower webs 24 cut by the cutting apparatus 16 are centrally positioned by a number of path rollers 44 of the winding apparatus 18, and then delivered to winding mechanisms 100 which wind the webs 24 around respective winding cores.

Operation of the film manufacturing apparatus 10 thus constructed will be described below.

The web 22 unreeled from the raw web 20 which is being rotated by the support shaft 28 passes through the edge position detector 30, and is corrected for a deviation of the edge of the web 22 from the ends of the feed rollers 32 in the feed apparatus 14. Thereafter, the web 22 is sent to the dancer roller unit 34.

To the dancer roller unit 34, there is connected a tension detector (not shown) which detects the tension of the web 22. Based on the detected tension, the dancer roller 56 is moved by an adjuster (not shown) to adjust the tension of the web 22 in order to apply a desired value of tension to the web 22.

The web 22 which has appropriately been tensioned by the dancer roller unit 34 is delivered via intervening feed rollers 32 to one of the crown rollers 38 which stretches the web 2 to remove wrinkles therefrom. The web 22 then reaches the suction roller 36.

When the web 22 reaches the suction roller 36, the suction roller 36 draws in air to attract the web 22. Upon rotation of the suction roller 36, the web 22 is delivered via the other feed rollers 32 and crown rollers 38 to the cutting apparatus 16. Then, the web 22 is cut into a plurality of narrower webs 24 by the upper and lower blades 40, 42 of the cutting apparatus 16.

The narrower webs 24 are then centrally positioned by the path rollers 44 of the winding apparatus 18, and then wound by the respective winding mechanisms 100.

The winding mechanisms 100 of the winding apparatus 18 according to the first embodiment will be described in detail below with reference to FIGS. 3 through 11.

Figure 3:
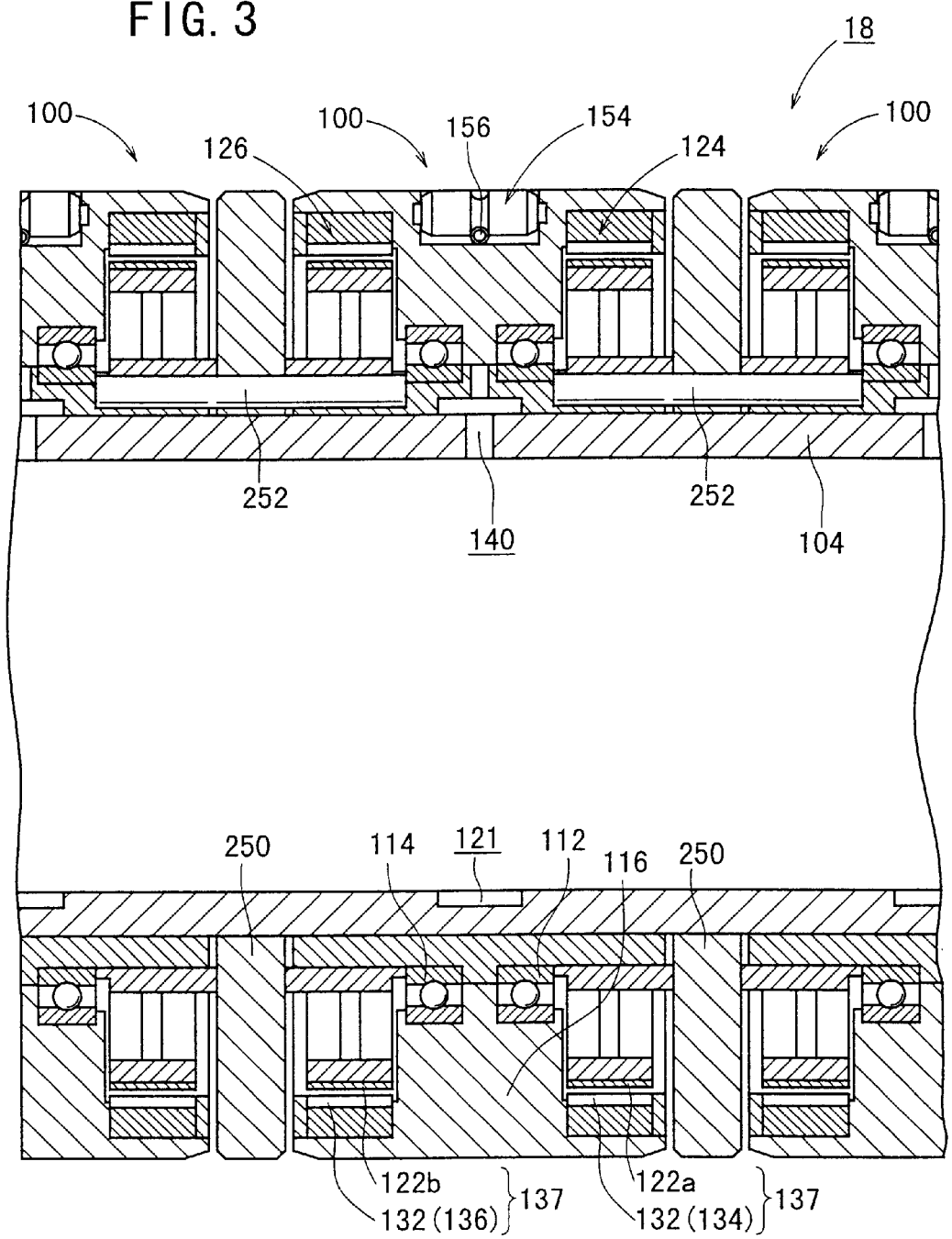
FIG. 3 is a fragmentary vertical cross-sectional view of a joined array of winding mechanisms of a winding apparatus according to a first embodiment which is incorporated in the film manufacturing apparatus.
Figure 4:
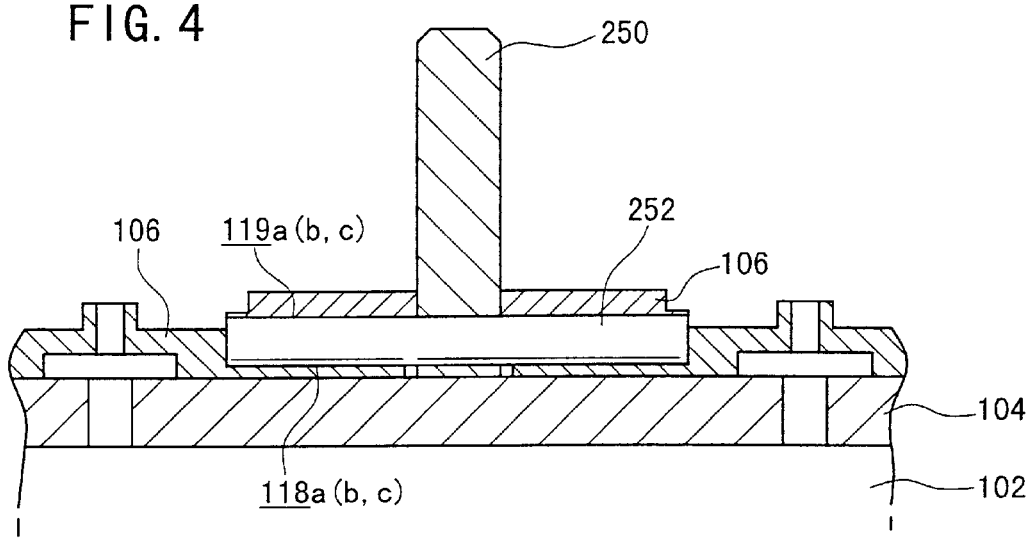
FIG. 4 is an enlarged vertical cross-sectional view of a joint between winding mechanisms.
Figure 5:
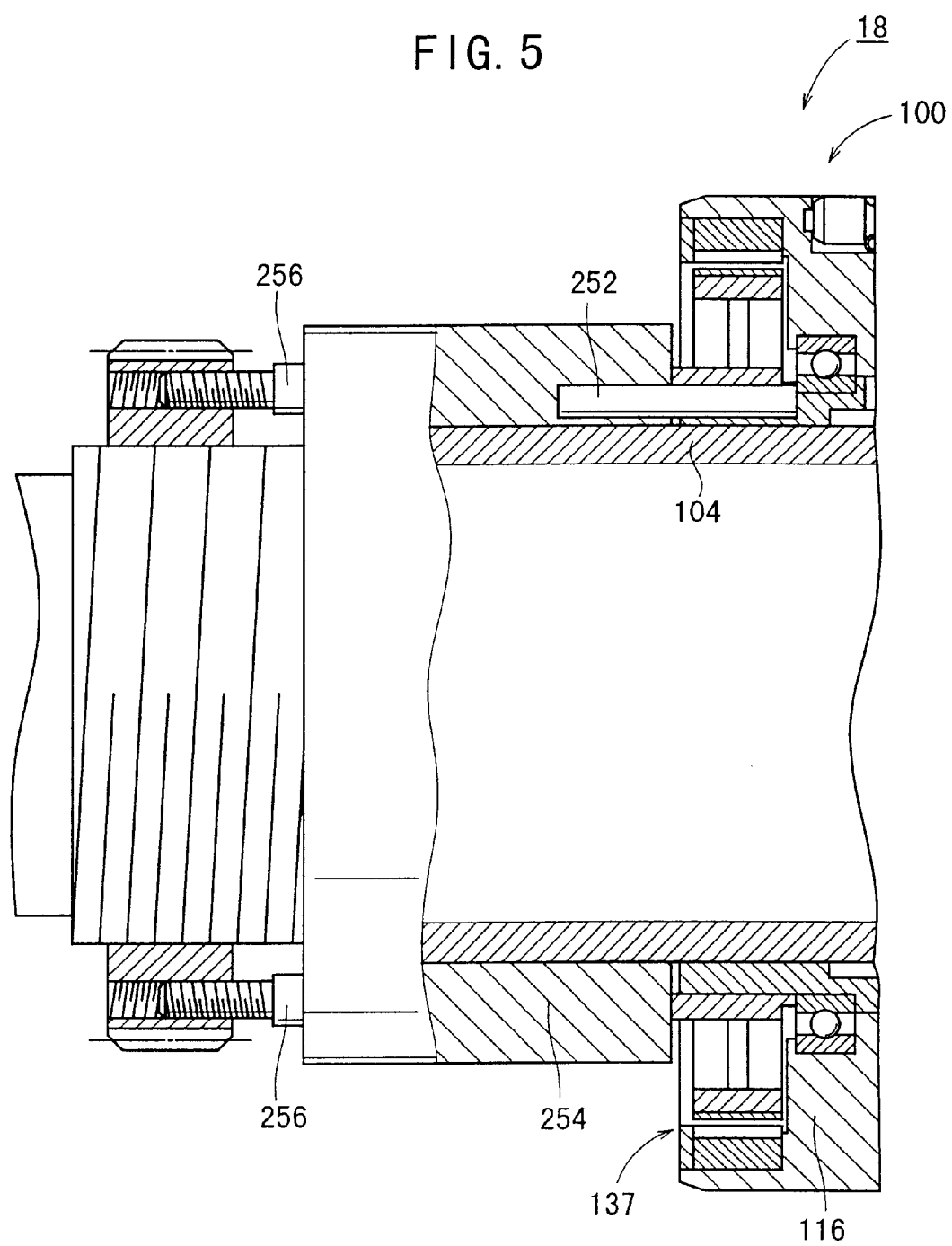
FIG. 5 is an enlarged fragmentary vertical cross-sectional view of the joined array of winding mechanisms.

As shown in FIG. 3, the winding mechanisms 100 are joined with a succession of spacers 250 interposed therebetween. The winding mechanisms 100 have respective torque transmitting members (joined members) 106 having six joining grooves 118a through 118f defined therein, support members 108, 110 having three grooves 119a through 119c defined in radially confronting relation to the joining grooves 118a through 118f, and keys (joining members) 252 of resin which are fitted in the joining grooves 118a through 118f and the grooves 119a through 119c. The keys 252 thus fitted in the joining grooves 118a through 118f and the grooves 119a through 119c axially join the winding mechanisms 100 (see FIG. 4).

Bolts 256 (see FIG. 5) are mounted on the opposite ends of the joined array of winding mechanisms 100 for preventing the winding mechanisms 100 from being disconnected. The bolts 256 axially press support members 254 fixed to a drive shaft 104 to prevent the winding mechanisms 100 from being disconnected.

Because the resin keys 252 are used to join the winding mechanisms 100, the weight of the joined winding mechanisms 100 is reduced, and unwanted noise is prevented from being produced when the winding mechanisms 100 are in operation. Since no key is required to be connected to the drive shaft 104 to join the winding mechanisms 100, no extra load needs to be imposed on the drive shaft 104, and the drive shaft 104 is prevented from being unduly deformed.

Figure 6:
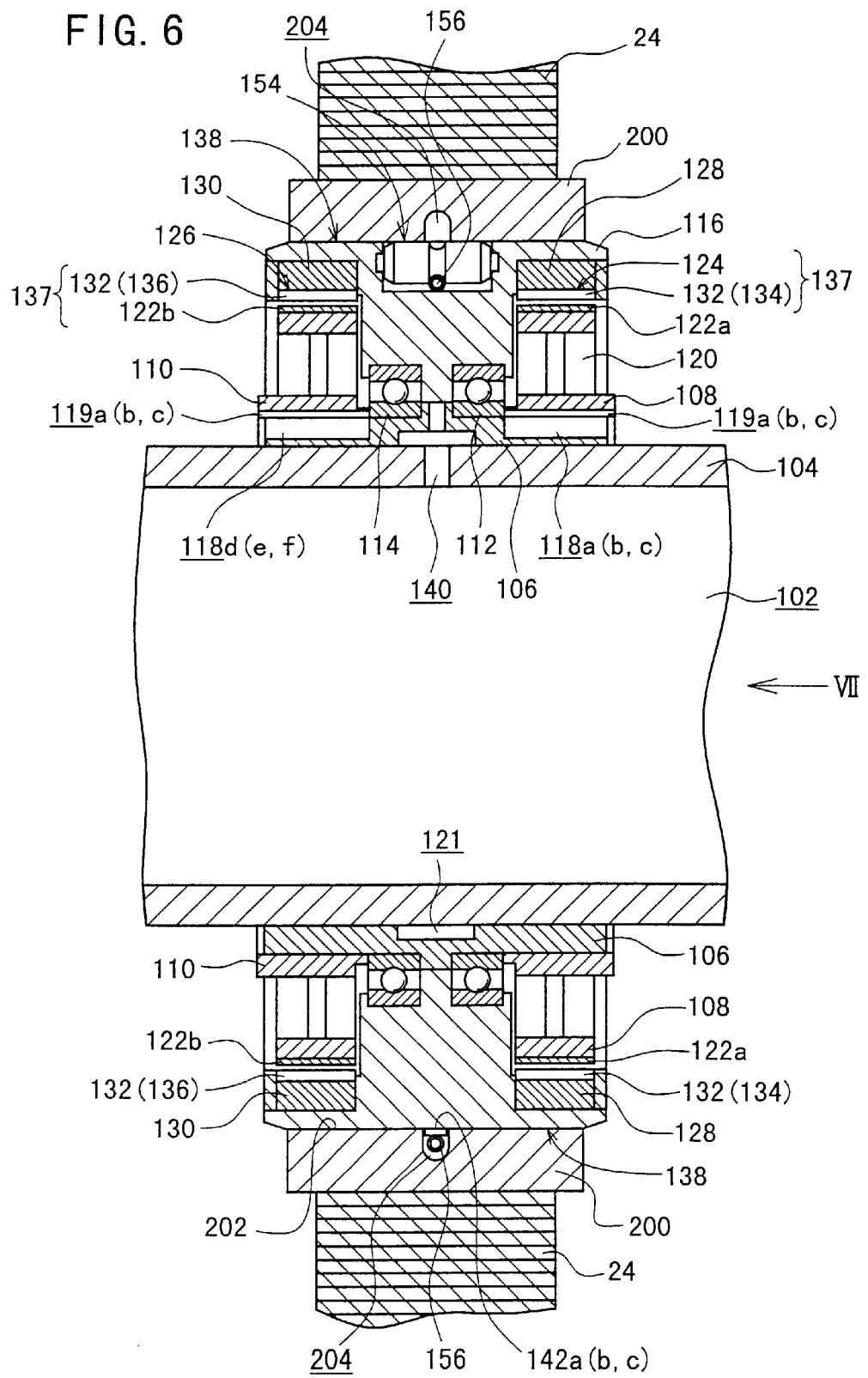
FIG. 6 is a vertical cross-sectional view of one of the winding mechanisms.
Figure 7:
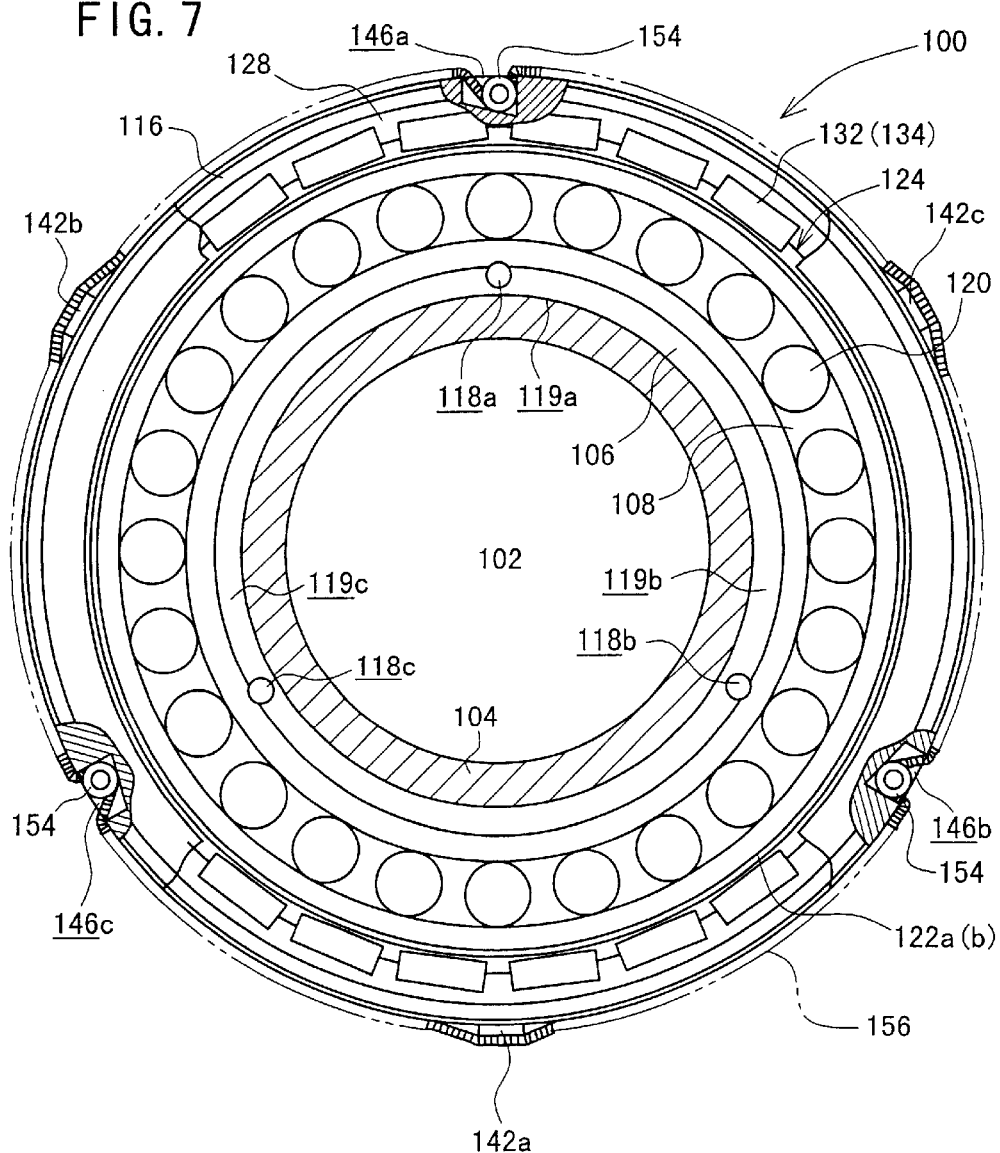
FIG. 7 is a side elevational view as viewed in the direction indicated by the arrow VII in FIG. 6.

One of the winding mechanisms 100 will be described in detail below with reference to FIGS. 6 through 9. As shown in FIGS. 6 and 7, the winding mechanism 100 comprises a drive shaft 104 having an axially extending space 102 therein, a torque transmitting member 106 fixedly mounted on the drive shaft 104 for transmitting torque upon rotation of the drive shaft 104, a pair of support members 108, 110 of metal fixedly mounted on the torque transmitting member 106, and a holder 116 rotatably mounted on the drive shaft 104 by a first bearing 112 and a second bearing 114.

Figure 8:
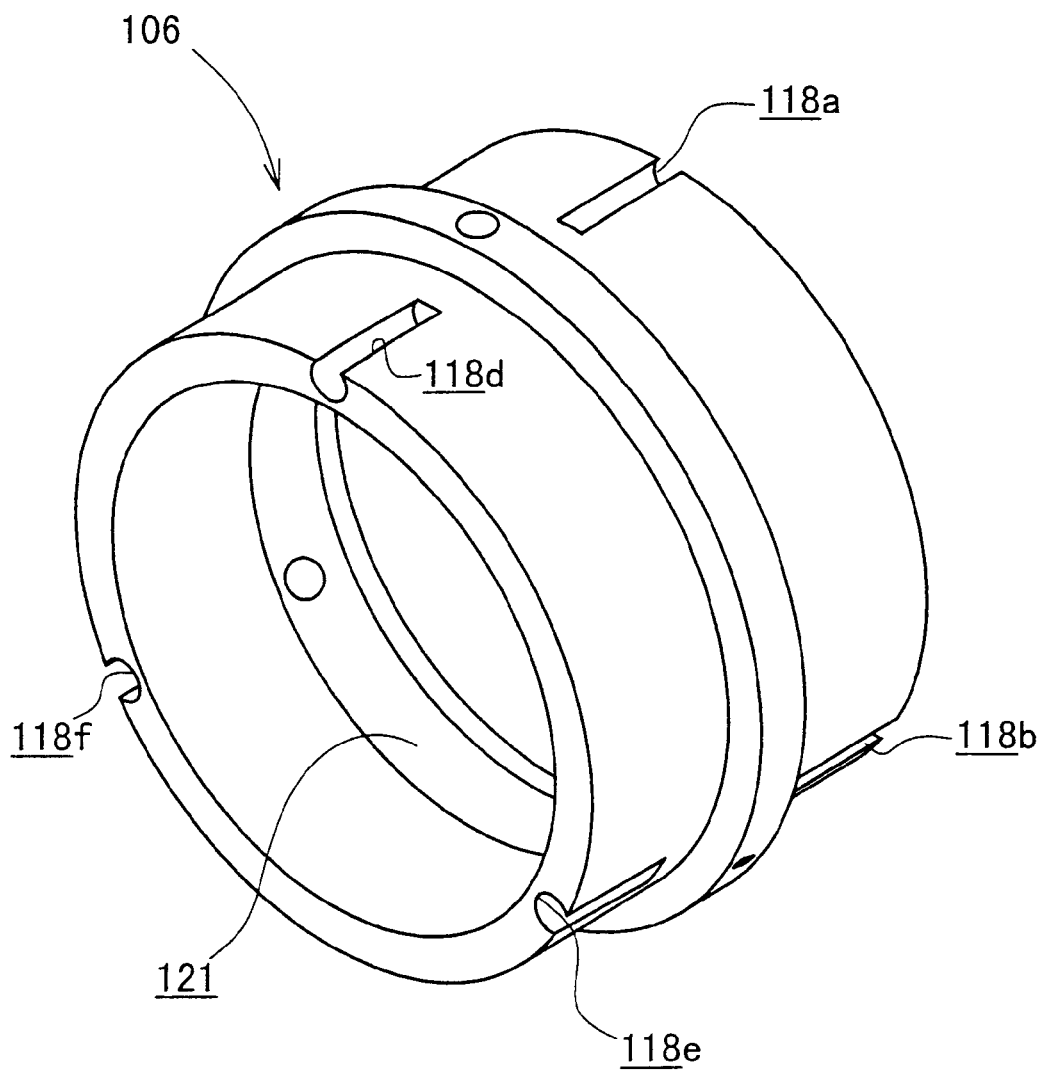
FIG. 8 is a perspective view of a torque transmitting member of the winding apparatus according to the first embodiment.

As shown in FIGS. 6 and 8, the torque transmitting member 106 has, as described above, six joining grooves 118a through 118f defined therein along the drive shaft 104 for joining the winding mechanisms 100 with the resin keys 252, and a circumferential groove 121 defined in an inner circumferential surface of the torque transmitting member 106.

The support members 108, 110 are in the form of annular members of metal which have spaces 120 defined therein, and have three grooves 119a through 119c defined therein in radially confronting relation to the joining grooves 118a through 118f. Ring-shaped seamless copper sheets 122a, 122b are pressed against the sides of the support members 108, 110 which are not fixed to the torque transmitting member 106.

The holder 116 has inner circumferential surfaces 124, 126, and a plurality of permanent magnets 132 are disposed on the inner circumferential surfaces 124, 126 by magnet holders 128, 130. The permanent magnets 132 are disposed at equally spaced intervals, providing permanent magnet arrays 134, 136. The ring-shaped seamless copper sheets 122a, 122b and the permanent magnet arrays 134, 136 face each other in the radial direction of the drive shaft 104, jointly making up a torque generating means 137.

Three cushioning members 142a through 142c of rubber are held against central areas of an outer circumferential surface 138 of the holder 116 and angularly spaced around the drive shaft 104 at angular intervals of about 120°. The cushioning members 142a through 142c have a longitudinal direction which is the same as the circumferential direction of the drive shaft 104. The cushioning members 142a through 142c have a length in the longitudinal direction which ranges preferably from 30 mm to 70 mm and more preferably from 30 mm to 50 mm.

Figure 9:
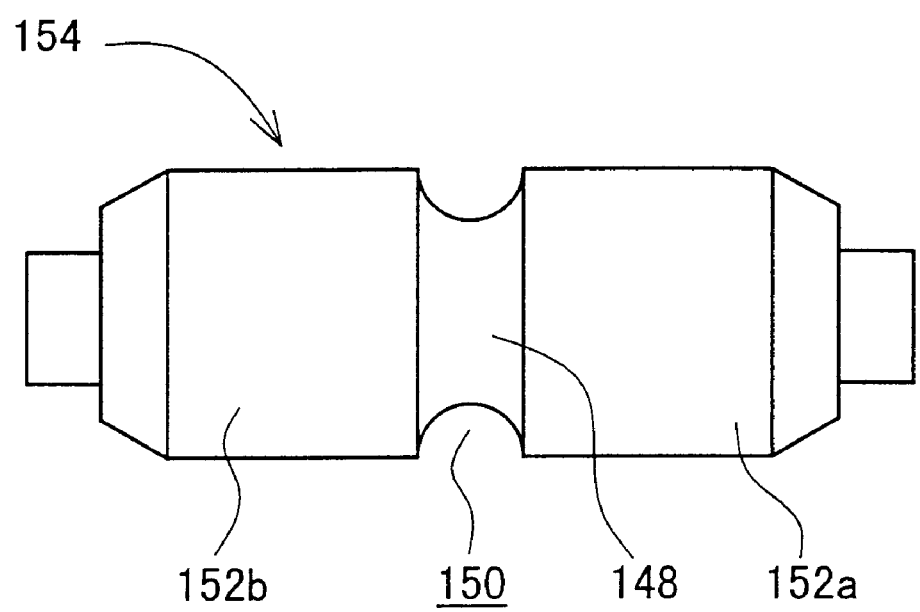
FIG. 9 is an enlarged cross-sectional view of a stopper of the winding apparatus according to the first embodiment.
Figure 10A:
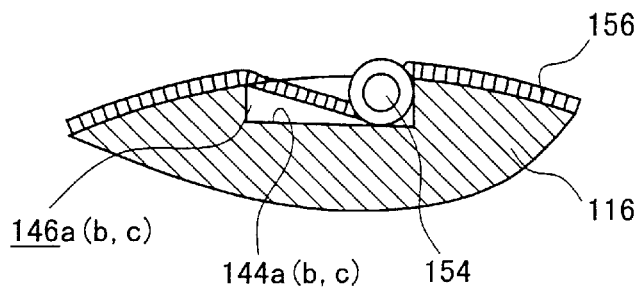
FIG. 10A is an enlarged cross-sectional view showing the position of the stopper in a chamber before a winding core is mounted.
Figure 10B:
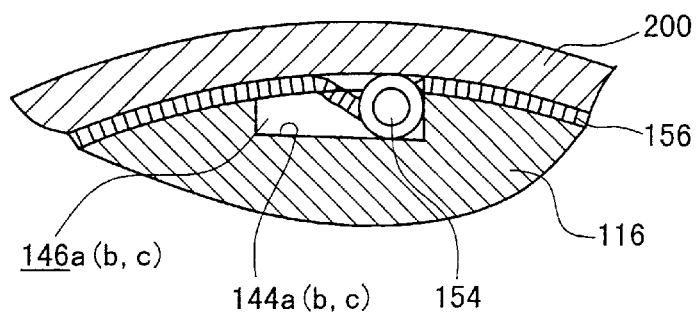
FIG. 10B is an enlarged cross-sectional view showing the position of the stopper in the chamber when a winding core is mounted.
Figure 10C:
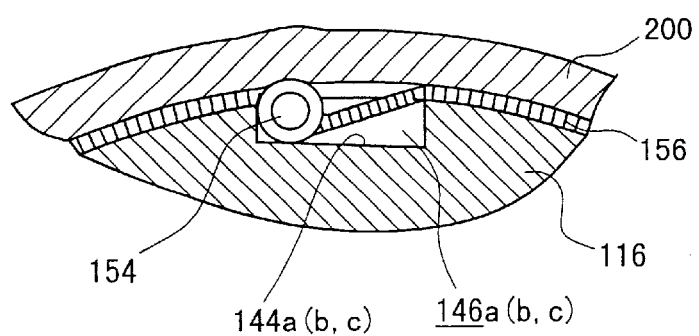
FIG. 10C is an enlarged cross-sectional view showing the position of the stopper in the chamber when a winding core is rotated and fixed to a holder.

The holder 116 has three chambers 146a through 146c defined in the outer circumferential surface thereof between the cushioning members 142a through 142c and having respective tapered bottom surfaces 144a through 144c (see FIGS. 10A through 10C). As shown in FIGS. 9 and 10A, stoppers 154 are disposed in respective chambers 146a through 146c and have respective portions projecting outwardly from the outer circumferential surface of the holder 116.

The stopper 154 has a central shaft 148 with a circumferential groove 150 defined therein and a pair of cylindrical members 152a, 152b fixed to respective opposite ends of the central shaft 148. The stoppers 154 are movable on the tapered bottom surfaces 144a through 144c of the respective chambers 146a through 146c.

A spring (resilient member) 156 is disposed on the outer circumferential surface 138 of the holder 116 for normally urging the cushioning members 142a through 142c radially inwardly on the holder 116, thus securely holding the cushioning members 142a through 142c on the holder 116. The spring 156 extends through the portions, near the holder 116, of the grooves 150 in the central shafts 148 of the stoppers 154 for thereby pressing the stoppers 154 radially outwardly of the holder 116.

The stoppers 154 are held against an inner circumferential surface 202 of a winding core 200 which is mounted on the holder 116. The pressing force of the spring 156 is imparted through the stoppers 154 to the winding core 200, and acts while the narrower web 24 is being wound around the winding core 200.

A groove 204 is defined centrally in the outer circumferential surface 202 of the winding core 200 and extends in the circumferential direction thereof. The groove 204 receives therein the cushioning members 142a through 142c. With the groove 204 receiving the cushioning members 142a through 142c, the winding core 200 is firmly secured to the holder 116 against detachment therefrom even while the narrower web 24 is being wound around the winding core 200.

A cooling means is provided for cooling at least the drive shaft 104 and the holder 116. The cooling means comprises a cooling hole 140 defined through the torque transmitting members 106 and the drive shaft 104, and a suction device (not shown) connected to an end of the drive shaft 104.

When the suction device is actuated, external cooling air is guided to the holder 116 through gaps between ring-shaped copper sheets 122a, 122b pressed against the support members 108, 110 of metal and the permanent magnet arrays 134, 136 and gaps between the permanent magnets 132, and the cooling air guided to the holder 116 is guided through the cooling hole 140 into the space 102 in the drive shaft 104. External cooling air is also guided through the spaces 120 in the support members 108, 110 to the holder 116, and the cooling air guided to the holder 116 is guided through the cooling hole 140 into the space 102 in the drive shaft 104. The cooling mean s functions to introduce cooling air from outside of the holder 116 into the holder 116 and the space 102 in the drive shaft 104.

The winding apparatus 18 according to the first embodiment is constructed as described above. Operation and advantages of the winding apparatus 18 will be described below with reference to FIGS. 10A through 11.

First, the winding core 200 is firmly fixed to the holder 116 by a lock means. The lock means serves to move the stoppers 154 disposed in the holder 116 in a direction to increase the pressing force applied to the winding core 200 outwardly of the holder 116 before the narrower web 24 is wounded.

The stoppers 154 disposed in the respective chambers 146a through 146c defined in the holder 116 are placed in the lowermost position (see FIG. 10A) on the tapered bottom surfaces 144a through 144c of the chambers 146a through 146c. At this time, the stoppers 154 have respective portions projecting outwardly from the outer circumferential surface of the holder 116.

Then, the cushioning members 142a through 142c pressed inwardly of the holder 116 by the spring 156 are fitted in the groove 204 defined in the inner circumferential surface 202 of the winding core 200. The winding core 200 is now mounted on the holder 116 with the stoppers 154 pressing the winding core 200 outwardly of the holder 116 (see FIG. 10B). At this time, the holder 116 and the winding core 200 have respective central positions lined up with each other.

The winding core 200 thus mounted on the holder 116 is rotated in a direction to wind the narrower web 24 therearound, i.e., in the direction in which the drive shaft 104 rotates. When the winding core 200 is rotated, the stoppers 154 roll to the uppermost position (see FIG. 10C) on the tapered bottom surfaces 144a through 144c of the chambers 146a through 146c between the inner circumferential surface 202 of the winding core 200 and the tapered bottom surfaces 144a through 144c.

As the stoppers 154 roll up the tapered bottom surfaces 144a through 144c, the portions of the stoppers 154 which project outwardly from the outer circumferential surface of the holder 116 increase, thus increasing the pressing force by which the stoppers 154 press the winding core 200 in the direction from the inner circumferential surface 202 of the winding core 200 outwardly of the holder 116.

The pressing force of the spring 156 wound around the holder 116 is applied to the winding core 200 through the stoppers 154 outwardly of the holder 116. Since the pressing force from the stoppers 154 and the pressing force from the spring 156 are applied to the winding core 200 outwardly of the holder 116, the winding core 200 is firmly secured to the holder 116.

Even while the narrower web 24 is being wound around the winding core 200, the winding core 200 is firmly secured to the holder 116 under the pressing force from the stoppers 154 and the pressing force from the spring 156. Consequently, the narrower web 24 can accurately be wound around the winding core 200 while the winding core 200 is prevented from being detached from the holder 116.

After the winding core 200 is firmly mounted on the holder 116, the drive shaft 104 is rotated. The torque transmitting members 106 fixed to the drive shaft 104 rotates with the drive shaft 104, causing the copper sheets 122a, 122b pressed against the support members 108, 110 of metal which are fixed to the torque transmitting members 106 to move across magnetic fluxes generated by the permanent magnets 132 of the permanent magnet arrays 134, 136.

Therefore, eddy currents are generated in the copper sheets 122a, 122b, and secondary magnetic fluxes generated by the eddy currents and the magnetic fluxes generated by the permanent magnets 132 attract each other, producing a torque substantially proportional to the slip rotational speed N (the difference between the rotational speed of the drive shaft 104 and the rotational speed of the holder 116). The generated torque is transmitted to the winding core 200 mounted on the holder 116 via the stoppers 154 that are disposed in the respective chambers 146a through 146c defined in the holder 116.

With the winding apparatus 18 according to the first embodiment, since the torque can be generated out of contact with the holder 116 by the torque generating means 137, tension variations can be reduced to ±5% or less and a large tension can easily and stably be produced even if a strip-like member having a large thickness ranging from 100 to 150 μm and a large width, such as a web of photographic photosensitive material (photographic film), is wound.

Since a stable winding tension is obtained, any displacements (wound shape failures) of the wound web in the transverse direction thereof (in the direction of the slit width) can be reduced. For example, such displacements which have been in the range from 2.0 to 5.0 mm can be reduced to a range from about 0.5 to 1.0 mm. As a result, the abrasion of edges of the turns of the web which has been wound is substantially eliminated, so that any damage which the wound web suffers is reduced and edge damage thereof is also reduced.

The winding apparatus is effective in winding not only a web of photographic photosensitive material (photographic film), but also a relatively thin, wide strip-like member (e.g., of paper, cloth, or the like) having a thickness ranging from 50 to 300 μm and a width ranging from about 15 to 70 mm.

In the first embodiment, since the winding apparatus has no contact members such as of felt and is not required to place an air tube in the drive shaft 104, it is not necessary to take into account the service life influenced by wear of components of the winding apparatus, and the maintenance of the winding apparatus is easy.

When the winding apparatus winds a strip-like member having a small thickness ranging from 10 to 20 μm and a small width, since its tension may be small, the amount of heat generated by the winding apparatus is small, and the winding apparatus may be naturally cooled on its own. However, when the winding apparatus winds a strip-like member having a large thickness ranging from 100 to 150 μm and a large width, such as a web of photographic photosensitive material, because the amount of heat generated by the winding apparatus is large, the narrower web 24 would tend to be deformed by the heat if the winding apparatus were not cooled.

According to the first embodiment, however, since the winding apparatus has the cooling means, it is possible to effectively cool the heat generated when the narrower web 24 is wound, and hence to avoid any deformation of the narrower web 24 with the heat.

The drive shaft 104, the torque transmitting members 106, the support members 108, 110, and the ring-shaped copper sheets 122a, 122b are integrally held together, and 10 the drive shaft 104, the torque transmitting members 106, the support members 108, 110, and the copper sheets 122a, 122b are all made of metal. Consequently, the heat generated by the copper sheets 122a, 122b at the time the narrower web 24 is wound is easily transmitted through the support members 108, 110 and the torque transmitting members 106 to the drive shaft 104, thus increasing the cooling efficiency.

According to the first embodiment, the two bearings 112, 114 are used for one holder 116. In order to reduce torque variations between these bearings 112, 114, several droplets of oil having a viscosity ranging from SAE 20 to 30 are introduced into the bearings 112, 114 after they are degreased by cleaning.

According to the first embodiment, furthermore, all the permanent magnets 132 are measured for the strength magnetic forces generated thereby before they are mounted at equal intervals on the inner circumferential surfaces 124, 126 of the holder 116 by the magnet holders 128, 130.

Thereafter, when the permanent magnets 132 are mounted as the permanent magnet arrays 134, 136 on the holder 116 by the magnet holders 128, 130, those permanent magnets 132 with stronger magnetic forces and those permanent magnets 132 with weaker magnetic forces are alternately arranged to uniformize the magnetic forces generated by the permanent magnet arrays 134, 136 (the number of permanent magnets 132 is increased as much as possible). As a result, the magnetic forces are uniformized and the magnetic flux density is increased, so that the slip rotational speed N is reduced and the amount of generated heat is reduced.

There is an ideal tension curve for winding the narrower web 24. Usually, when the narrower web 24 is wound by the winding mechanism 100, the diameter of the roll of the narrower web 24 wound on the holder 116 increases as the winding of the narrower web 24 progresses, and the rotational speed of the holder 116 decreases. As shown in FIG. 11, as the diameter of the roll of the narrower web 24 increases, a tension curve a drops possibly away from an ideal tension curve b. To avoid such a tension curve deviation, the rotational speed of the drive shaft 104, which is normally held constant, is increased by 20 to 30% to bring the tension curve a closely to the ideal tension curve b.

The ideal tension curve b varies depending on the material and the dimensions of the strip-like member wound around the holder 116. By selecting the rotational speed of the drive shaft 104 depending on the diameter of the roll of the strip-like member, the tension curve can be made closer to the optimum tension curve for the strike-like member.

Figure 14:
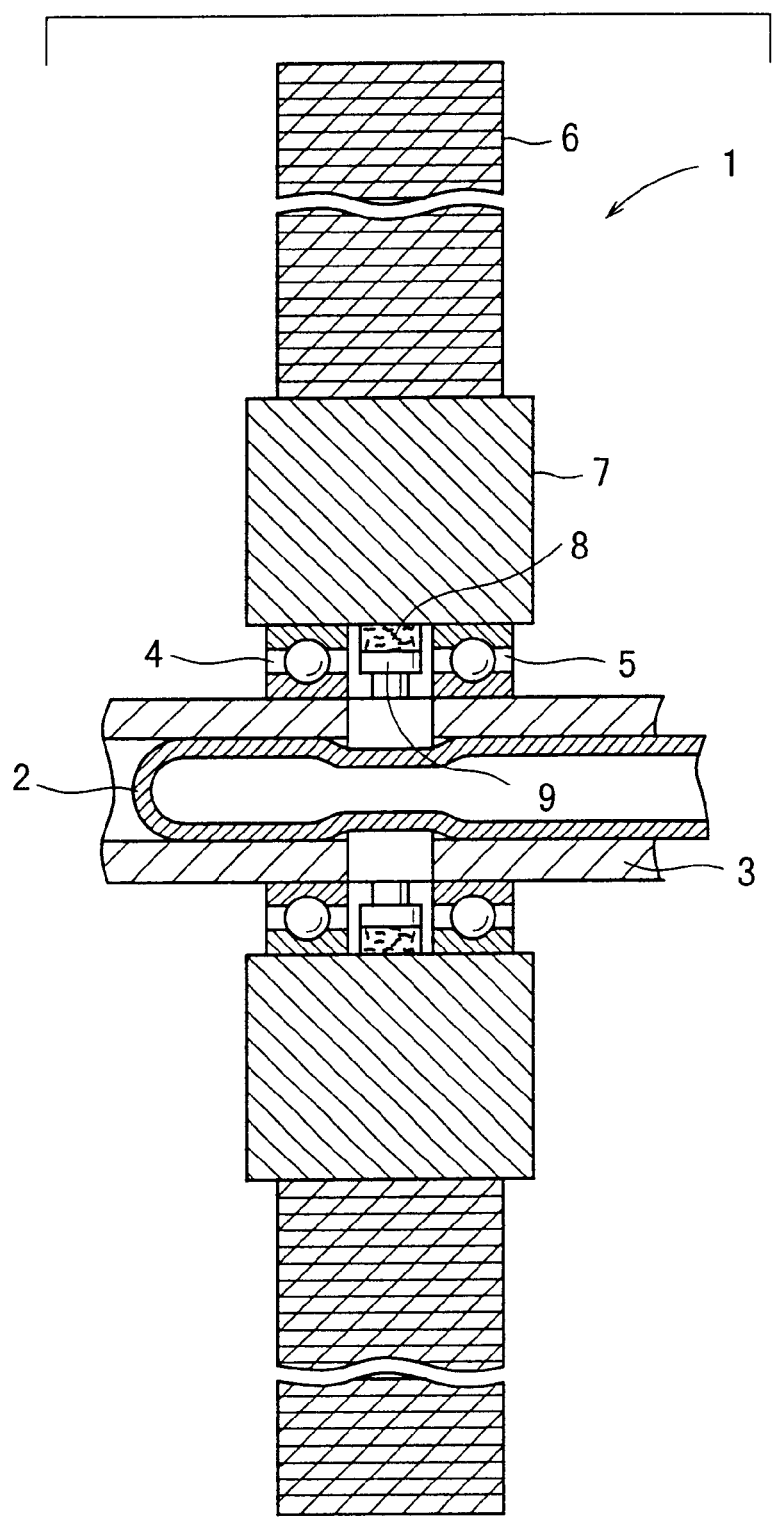
FIG. 14 is a vertical cross-sectional view of a conventional web winding apparatus.

After the winding of the web 24 is finished, since the pressure of the wound web 24 is applied to the winding core 200, the conventional winding apparatus 1 (see FIG. 14) needs intensive laborious attempts to release the winding core 200 from the winding apparatus 1.

In the winding mechanism 100, however, when the winding core 200 on which the narrower web 24 is wound is rotated in the direction opposite to the direction in which the narrower web 24 is wound, i.e., in the direction opposite to the direction in which the drive shaft 104 rotates, the stoppers 154 roll to the lowermost position (see FIG. 10A) on the tapered bottom surfaces 144a through 144c of the chambers 146a through 146c.

Therefore, the pressing force applied to the winding core 200 outwardly of the holder 116 by the stoppers 154 and the spring 156 is reduced, allowing the winding core 200 to be easily released from the holder 116.

FIG. 12 schematically shows, partly in block form, a film manufacturing apparatus 300 incorporating a winding apparatus according to a second embodiment of the present invention. Those parts of the film manufacturing apparatus 300 which are identical to those of the film manufacturing apparatus 10 according to the first embodiment are denoted by identical reference numerals, and will not be described in detail below.

The film manufacturing apparatus 300 has a feed apparatus 302, a cutting apparatus 304, and a winding apparatus 306 according to the second embodiment. A tension pickup 308, if required, is disposed between the cutting apparatus 304 and the winding apparatus 306. The cutting apparatus 304 has a disk-shaped upper blade 40a and a disk-shaped lower blade 42a for cutting the web 22 into a number of narrower webs, the upper blade 40a and the lower blade 42a having respective cutting edges confronting each other.

The film manufacturing apparatus 300 also has a first servomotor 310 for rotating the suction roller 36, a second servomotor 312 for rotating the lower blade 42a, and a third servomotor 314 for rotating the drive shaft 104. The first through third servomotors 310, 312, 314 are controlled by a controller 322 through respective first through third servomotor drivers 316, 318, 320.

The film manufacturing apparatus 300 further includes a first pulse generator 324 for detecting a rotational speed of the suction roller 36, a second pulse generator 326 for detecting a rotational speed of the second servomotor 312, and a third pulse generator 328 for detecting a rotational speed of the third servomotor 314. The first through third pulse generators 324, 326, 328 send pulse signals to the first through third servomotor drivers 316, 318, 320 and the controller 322.

The controller 322 has a calculating circuit 330 for calculating a radius R of the roll of the web to be wound around the winding core 200 based on the thickness t of the web 22 which is supplied thereto, and a PI control circuit 332 for controlling, according to a PI control process, information of winding tension characteristics set therein which include an initial tension to be obtained when the web is wound and a rate of change of the tension (taper). The calculating circuit 330 and the PI control circuit 332 produce output signals that are used as a drive signal to energize the third servomotor 314 through the third servomotor driver 320.

Operation of the winding apparatus 306 in the film manufacturing apparatus 300 thus constructed will be described below.

The calculating circuit 330 calculates a diameter D of the roll of the web to be wound around the winding core 200 from a length (cut length) L by which the web 22 is to be wound, a thickness t of the web 22, and the diameter D0 of the winding core 200. Specifically, the diameter D is calculated according to the following equation (1):

$$\frac{\pi}{4}D^2 = \frac{\pi}{4}D0^2 + tL \quad (1)$$

$$\therefore D = \sqrt{\frac{4tL}{\pi} + D0^2}$$

Figure 13:
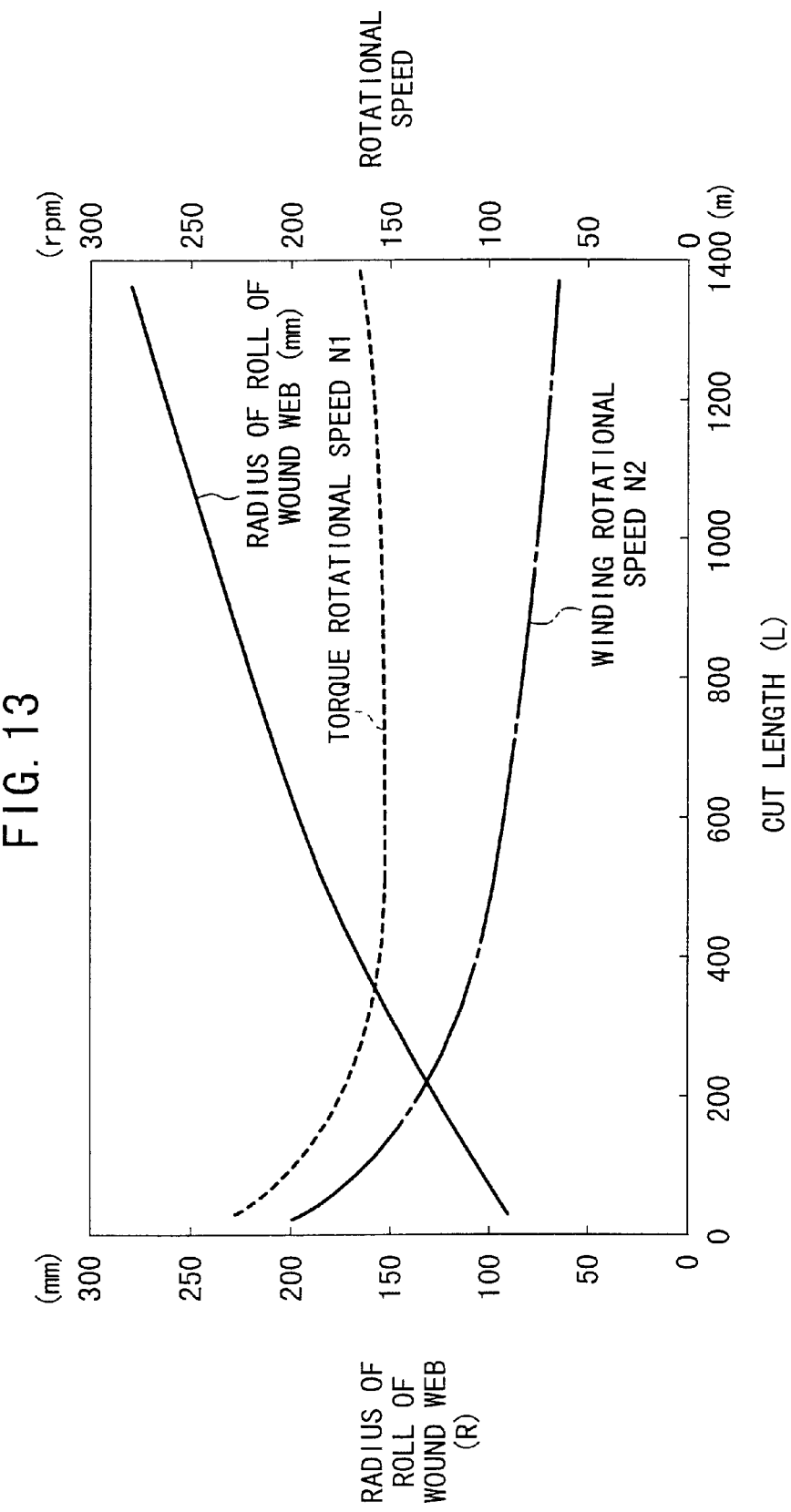
FIG. 13 is a diagram showing the relationship between a cut length, a radius of a wound web, and a rotational speed.

As shown in FIG. 13, the relationship between the cut length L of the web 22 and the radius R of the roll of the wound web is obtained, and a winding tension corresponding to the radius R of the roll of the wound web is calculated. An initial tension is set to 1000 g, for example, and a rate of change of the tension (taper) corresponding to a change in the radius R of the roll of the wound web is set.

The calculating circuit 330 is supplied with the rotational speed of the suction roller 36 from the first pulse generator 324 and also with the cut length L of the web 22 at all times, and calculates a radius R of the roll of the wound web corresponding to the cut length L. The controller 322 calculates a winding tension corresponding to the radius R of the roll of the wound web, and also calculates a winding torque corresponding to the calculated winding tension.

As shown in FIG. 13, the rotational speed N (rpm) for winding the web 22 is set so as to correspond to the cut length L, and a slip rotational speed to obtain the calculated winding tension, i.e., corresponding to the calculated winding torque, is added to the winding rotational speed N to set a torque rotational speed N1 which is the rotational speed of the drive shaft 104. The slip rotational speed represents the difference between the rotational speed of the drive shaft 104 and the rotational speed of the holder 116, i.e., torque characteristics of the holder 116, and has experimentally been set based on the relationship to the winding torque.

According to the second embodiment, therefore, the cut length L of the web 22 is supplied to the calculating circuit 330 based on the rotational speed of the suction roller 36 supplied via the first pulse generator 324, and the winding tension is calculated based on the radius R of the roll of the wound web calculated by the calculating circuit 330. In order to obtain the calculated winding tension, the slip rotational speed depending on the torque characteristics of the holder 116 is added to the winding rotational speed N of the holder 116 to set the rotational speed (torque rotational speed N1) of the drive shaft 104.

The winding apparatus 306 thus winds the web 22 around the winding core 200 under stable tension at all times, and hence winds the web 22 highly accurately. The winding apparatus 306 is capable of easily handling variations of the thickness t of the web 22, and hence can wind films to various radii R efficiently and accurately under simple control.

As with the first embodiment, the winding apparatus 306 employs the torque generating means 137 providing the magnet holders, for generating a torque out of contact with the holder 116. Therefore, the winding apparatus 306 can obtain a large tension easily and stably, as with the first embodiment.

As shown in FIG. 12, the tension pickup 308 is incorporated to detect a torque change due to aging and a temperature change. The detected torque change is fed back to correct the torque for obtaining a stable winding torque.

The first through third servomotors 310, 312, 314 may comprise AC servomotors or DC servomotors combined with transmissions.

With the film winding method and apparatus according to the present invention, as described above, a winding tension for the holder corresponding to the radius of the roller of the web is calculated, and a rotational speed of the drive shaft is set to obtain the calculated winding tension. The drive shaft is rotated to cause the torque generating means to control the rotational speed of the holder for thereby winding the web fixed to the holder under the stable winding tension at all times. Therefore, the film winding method and apparatus can wind webs of various thicknesses and different cut lengths around the core highly accurately.

With the film manufacturing apparatus according to the present invention, tension variations can be reduced to ±5% or less and a large tension can easily and stably be produced when a strip-like member having a large thickness ranging from 100 to 150 μm and a large width, such as a web of photographic photosensitive material (photographic film), is wound. The maintenance of the film manufacturing apparatus is facilitated and the winding core with the wound web thereon can be easily removed.

Although certain preferred embodiments of the present invention have been shown and described in detail, it should be understood that various changes and modifications may be made therein without departing from the scope of the appended claims.

What is claimed is:

1. An apparatus for winding a web, comprising:

a plurality of winding mechanisms each having a holder rotatably mounted on a drive shaft, a torque generating means for generating a torque for rotating the holder, joined members having joining grooves, and lock means for preventing a winding core from being detached from said holder when the web is wound around the winding core;

said winding mechanisms being joined together as a joined array by winding mechanism joining members fitted in said joining grooves.

2. An apparatus according to claim 1, wherein said torque generating means comprises magnets and copper sheets selectively mounted on said drive shaft and said holder.

3. An apparatus according to claim 1, wherein said lock means comprises:

stoppers for pressing said winding core outwardly of said holder; and moving means for moving said stoppers in a direction to increase a pressing force applied to said winding core before said web is wound around said winding core, and moving said stoppers in a direction to reduce the pressing force applied to said winding core when the winding core with the web wound therearound is removed from said holder.

4. An apparatus according to claim 3, wherein said moving means has chambers defined in said holder and having tapered bottom surfaces, said stoppers being rotatably disposed in said chambers and having portions projecting outwardly from the outer circumferential surface of said holder.

5. An apparatus according to claim 3, further comprising:

a resilient member wound around said holder for applying the pressing force to said winding core through said stoppers.

6. An apparatus according to claim 5, further comprising:

cushioning members held against the outer circumferential surface of said holder and pressed inwardly of said holder by said resilient member.

7. An apparatus according to claim 6, wherein said winding core has a groove defined therein, said cushioning members being fitted in said groove.

8. An apparatus according to claim 3, wherein a torque generated by said drive shaft is transmitted through said stoppers to said winding core.

9. An apparatus according to claim 1, wherein said joining members are made of resin.

10. An apparatus according to claim 1, wherein said joined array of the winding mechanisms has bolts attached to opposite ends thereof for preventing the winding mechanisms from being detached.

* * * * *